(12) United States Patent
Maile et al.

(10) Patent No.: US 7,455,578 B2
(45) Date of Patent: Nov. 25, 2008

(54) CASING BRAKE ADJUSTABLE DURING PRODUCTION

(75) Inventors: Bernd Maile, Oggelshausen (DE); Armin Kibler, Eberhardzell (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 11/891,338

(22) Filed: Aug. 10, 2007

(65) Prior Publication Data
US 2008/0057847 A1 Mar. 6, 2008

(30) Foreign Application Priority Data
Aug. 10, 2006 (EP) .................. 06016723

(51) Int. Cl.
*A22C 11/00* (2006.01)
(52) U.S. Cl. .................................... 452/37
(58) Field of Classification Search ............ None
See application file for complete search history.

(56) References Cited

U.S. PATENT DOCUMENTS

| 3,748,690 A |   | 7/1973  | Niedecker et al. |        |
|-------------|---|---------|------------------|--------|
| 3,751,764 A |   | 8/1973  | Dobbert          |        |
| 3,872,543 A | * | 3/1975  | Niedecker        | 452/38 |
| 4,442,568 A | * | 4/1984  | Petry            | 452/38 |
| 4,535,508 A | * | 8/1985  | Aceto            | 452/38 |
| 5,067,313 A | * | 11/1991 | Evans            | 53/576 |
| 5,074,386 A | * | 12/1991 | Evans            | 188/67 |
| 5,087,463 A | * | 2/1992  | Raudys et al.    | 426/138 |
| 5,197,914 A | * | 3/1993  | Powers           | 452/32 |
| 6,132,302 A | * | 10/2000 | Hiller et al.    | 452/45 |
| 6,688,959 B2 | * | 2/2004 | Kasai et al.     | 452/30 |
| 6,964,605 B2 | * | 11/2005 | Kasai et al.    | 452/32 |

FOREIGN PATENT DOCUMENTS

| CH | 682440       | 9/1993  |
|----|--------------|---------|
| DE | 2018454      | 11/1971 |
| DE | 2236081      | 1/1974  |
| DE | 8705899      | 4/1987  |
| DE | 202005006495 | 8/2006  |
| EP | 0171849      | 2/1986  |
| EP | 0247462      | 12/1987 |

\* cited by examiner

*Primary Examiner*—Thomas Price
(74) *Attorney, Agent, or Firm*—Marshall, Gerstein & Borun LLP

(57) ABSTRACT

A casing brake for holding a casing at a free end of a stuffing pipe, via which the casing is stuffed with a pasty material, and to a method for adjusting the brake power of a casing brake. To adjust an exact brake power, the casing brake has a brake ring which is arranged around the stuffing pipe and can be prestressed axially and/or radially in such a way that it presses the casing onto the stuffing pipe, straining means for axially and/or radially straining the brake ring, as well as an adjusting device exerting a force on the straining means such that the axial and/or radial prestress of the brake ring is adjustable and maintained during the production.

21 Claims, 5 Drawing Sheets

CASING BRAKE ADJUSTABLE DURING PRODUCTION

CROSS-REFERENCE TO RELATED APPLICATION

The present application claims the benefit of priority of European Patent Application No. 06016723.6 filed Aug. 10, 2006. The entire text of the priority application is incorporated herein by reference in its entirety.

FIELD OF THE DISCLOSURE

The disclosure relates to a casing brake and to a method for adjusting the brake power of a casing brake, such as used in production of meat products.

BACKGROUND OF THE DISCLOSURE

In the sausage production by machine, the casing is first fitted onto the stuffing pipe at the machine outlet. Then, the casing brake is positioned at the end of the stuffing pipe.

Casing brakes are used to hold the casing under tension at the filling point, i.e. at the end of the stuffing pipe, when it is stuffed with material (e.g. sausage meat). This is a requirement for the production of well-rounded, high-quality sausages. If the casing can be pulled off the stuffing pipe too easily during the stuffing process, however, a poor filling degree is obtained.

Besides, the casing brake causes a co-rotation of the still unstuffed casing on the stuffing pipe during the twist-off process, while the part of the sausage already stuffed does not co-rotate or is retained, respectively, due to inertia. By this relative movement a twist-off point is produced at the location of the casing brake. That is, the sausage is shaped into portions.

Such a casing brake with a brake rubber, which externally presses the casing onto the stuffing pipe, is already known from EP 0 247 462 and is illustrated, for example, in FIG. 5. The brake rubber 1 forms part of the casing brake. The sealing lip of the brake rubber is directed inwardly to the stuffing pipe. The conical brake rubber is axially strained between two shells 2 and 3. This is usually done by a thread between the shells. By straining the brake rubber over a slope the diameter of the sealing lip can be altered and, thus, the brake power can be adjusted. Due to the high dynamics of the components a variation of the braking prestress caused by inertia should by all means be avoided during the production. Therefore, the adjustment is usually configured to be heavy so that a variation is possible only with difficulties. The adjustment of the braking effect during the production specifically in the driven variant type is therefore not possible, but is accomplished during the machine down time. This leads to an interruption of the production. Thus, the brake power cannot be adapted in an ideal manner. The adjusted brake power has to be checked during the operation and, if necessary, readjusted iteratively, which requires, again, a machine down time. Depending on the configuration, the system maintains the last adjusted braking prestress when the brake is removed from the brake transmission. A disassembly of the brake, e.g. for cleaning the individual components, results in a loss of this last adjusted braking prestress, however. After the assembly, this last adjustment is not restored, but has to be found again during the production by a readjustment in production stops.

Also, casing brakes with a brake rubber are already known, which is mounted on the stuffing pipe and presses outwardly onto the casing. The brake rubber forms here a part of the stuffing pipe and is permanently connected to the same. The sealing lip of the brake rubber is directed towards the outside, with a conically shaped sleeve straining the brake rubber. This solution, too, is disadvantageous because only the preceding brake adjustment is maintained. For example, as soon as a caliber is altered, the adjustment of the previous caliber gets lost. Thus, the brake has to be readjusted with each caliber alteration. The braking prestress is only hard to reproduce. The external lip of the brake rubber on the stuffing pipe can easily get damaged. Moreover, the sealing lip makes it difficult to mount the casing.

SUMMARY OF THE DISCLOSURE

Based on the foregoing it is the object of the present disclosure to provide a casing brake and a method for adjusting the brake power, which allow an exact, reproducible and easy adjustment of the brake power.

According to the present disclosure the strain or the brake power, respectively, of the casing brake, preferably in connection with a driven casing brake, allows an easy adjustment during the production. During the production means, in this case, that the stuffing machine does not stand still, but that the stuffing process is in progress, i.e. that pasty material is pushed into a casing. This allows a very exact adjustment of the casing brake. The stuffing apparatus need not be stopped for this purpose, and the casing brake need not be removed. It is even possible to adjust the brake power when the straining means is driven together with the stuffing pipe about the longitudinal axis of the stuffing pipe.

Due to the fact that, according to the present disclosure, an adjusting device is provided in addition to the straining means, which acts on the straining means and which maintains the strain of the brake ring, the brake ring can be adjusted externally without having to stop the production or disassembling the brake. As the adjusting device can be maintained in the state which corresponds to a specific brake power, the straining means can be disassembled for cleaning, wherein the braking prestress is maintained when the components are reassembled. Due to the fact that the brake power can be adjusted during the production, the level of the brake power can be defined exactly. An easy readjustment is also possible during operation, e.g. when the brake power fades.

During the production the straining means can be rotated at least temporarily about the longitudinal axis of the stuffing pipe for twisting off the stuffed casing, wherein the adjusting device is not driven and does not rotate.

Also when the casing brake is removed and cleaned, different adjustments for different calibers can be maintained so as to allow the use of different brakes with a preadjusted brake power for different calibers.

According to a preferred embodiment the straining means comprises a first and a second shell between which the brake ring is disposed, wherein at least the first shell can be displaced freely toward the other shell in an axial direction, wherein the adjusting device displaces at least one shell. Freely displaceable here means, contrary to the prior art, that the shells are not moved towards or away from each other by means of a thread, but that they can be displaced relative to each other by means of a force acting in the axial direction (or including at least one axial component). This easy displaceability easily allows an external pressure to be exerted on at least one of the shells, by which the axial strain of the brake rubber is changed. Such a movement can also easily be performed during the production.

The braking device may further comprise at least one bearing, so that the first and second shell are rotatably mounted and can also be driven about the longitudinal axis of the stuffing pipe.

Specifically, the adjusting device may comprise a holding device, e.g. a holding star, which is arranged opposite to the free end of the stuffing pipe for retaining the stuffed casing against twisting, wherein at least one part of the holding device is substantially axially adjustable and presses against the first shell. Thus, the holding device provided in the casing brake can be easily used to exert a pressure on the axially adjustable shell.

Advantageously, a sliding ring is mounted between the holding device and the shell, which transfers the force to the first shell. When the brake power is adjusted, it then presses the holding device more or less strongly onto the shell. The use of the sliding ring is particularly wear-resistant because it can be exchanged in an easy and cost-effective manner, wherein neither the shell nor the holding device are worn out during the operation of the casing brake.

It is advantageous if the two shells are configured as a preassembled unit in such a way that they can be displaced axially relative to each other, and further comprise a shell connection which is embodied such that the shells do not fall apart. Such a shell connection can be, for example, a snap, a bayonet or a similar connection. Such an embodiment allows a fast assembly, disassembly and cleaning of all components. The first and second shell may thereby be connected to each other by the shell connection, wherein the second shell is fixed to a receptacle which is, again, rotatably mounted about the longitudinal axis of the stuffing pipe by at least one bearing.

According to another embodiment the adjusting device comprises a magnet, wherein the first shell is embodied at least partially magnetically in such a way that the shell is axially displaceable by the magnetic force. An essential advantage of this alternative resides in the contactless and, thus, wearless axial transmission of forces between the adjusting device and the shell, i.e., for example, between rotating and stationary magnet.

The magnet of the adjusting device may thereby be axially displaceable, wherein the displacement causes a variation of the distance of the magnets relative to each other so that the shell can be displaced to a different extent. The magnet of the adjusting device may thereby form part of the holding device or holding star, respectively. For adjusting the magnetic force the magnet can, for example, be embodied, e.g. as an electromagnet, such that its magnetic force and thus the force acting on the displaceable shell can be varied by corresponding means.

According to another embodiment the adjusting device comprises a sealed space, in which a fluid is enclosed and which includes two sections, whereof one is movable in an axial direction if the pressure in the sealed space is changed and transfers an axial force to the first shell, wherein the casing brake further includes means for changing the pressure in the space. In this case, too, there is the advantage that, for example, the transmission of the axial force from the stationary part to the rotating part can be realized nearly frictionless and, thus, wearless. The section moving in an axial direction is advantageously integral with the first shell. The pressure in the space can be changed by varying the volume or by varying the filling amount of the medium through a corresponding duct.

According to another embodiment of the present disclosure the straining means comprises a shell which supports the brake ring, and a magnet which likewise supports the brake ring due to its magnetic force, wherein the brake ring is at least partially magnetic such that the brake ring can be strained axially and/or radially by the magnetic force.

This embodiment, too, is extremely simple and wear-resistant. In this case, too, the adjusting device can be embodied such that the magnet is disposed to be axially movable, or means for changing the magnetic force of the magnet, which is arranged opposite to the brake ring, can be provided.

According to the present disclosure both shells may also be mounted separately in corresponding bearings, wherein at least one of the bearings can be displaced axially. The braking effect can be adjusted by an axial displacement of the bearings relative to each other, preferably by pressing onto the movable bearing ring.

The adjusting device may be embodied such that the first shell is movable in an axial direction by means of compressed air or a water jet.

Brief description of the drawings The present disclosure will be explained in more detail below, with reference to the accompanying drawings.

DETAILED DESCRIPTION OF THE DISCLOSURE

Figure 1:
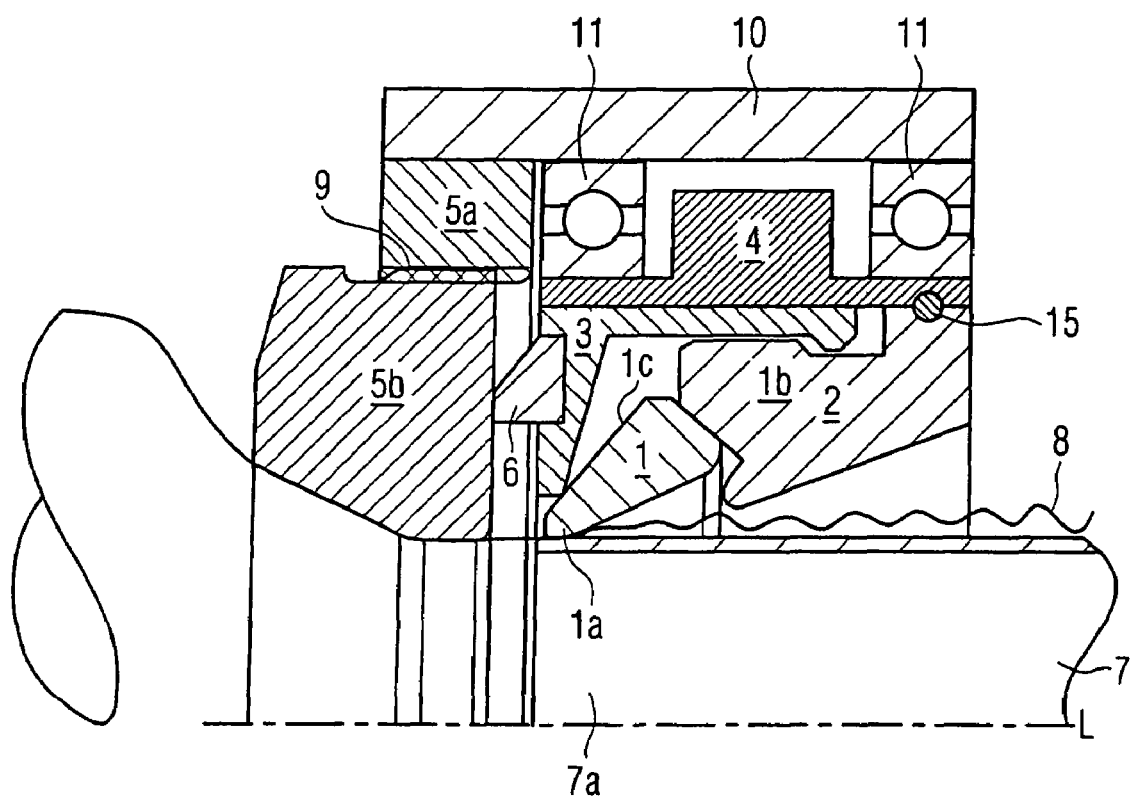
FIG. 1 shows a longitudinal section through a first embodiment according to the present disclosure.

FIG. 1 shows a first embodiment according to the present disclosure. 7 designates a stuffing pipe, through which pasty material is to be conveyed in a manner known per se into a sausage casing 8 pulled over the stuffing pipe 7. The stuffing pipe is fed with portions of pasty material via a non-illustrated hopper and a non-illustrated portioning device, which is generally known and shall not be explained herein in more detail.

In the production of sausages by machine, first the sausage casing 8 is mounted on the stuffing pipe 7 at the free end 7a thereof. Then, in a manner known per se, the casing brake is positioned at the end of the stuffing pipe 7a.

Depending on the embodiment, the stuffing pipe 7 may be mounted rotatably and, if necessary, is driven by a non-illustrated drive about the central axis L. The casing brake comprises a stationary housing 10 as well as a brake ring 1, which is made of an elastic material and is specifically embodied as a brake rubber. The brake ring 1 is disposed concentrically relative to the stuffing pipe 7.

The casing brake comprises a straining means 2, 3 for axially and/or radially straining the brake ring 1. Axial or radial direction, respectively, here means a direction including at least one axial or radial component. The straining means comprises the shells 3 and 2, which are likewise disposed concentrically relative to the stuffing pipe 7. The brake ring 1 is inserted between the shells 2, 3. The brake ring has a substantially conical section and presses with its sealing lip 1a the casing 8 onto the stuffing pipe 7. The brake ring is directed with its sealing lip 1a obliquely inwardly toward the stuffing pipe 7. The brake ring 1 comprises on its wider end an oblique end face 1b which comes to bear on an oblique surface of the shell 2. The shell 3 presses onto the upper surface 1c of the conical brake ring 1. By straining the brake ring 1 between shells 3 and 2 the brake pressure and, thus, the diameter of the sealing lip 1a can be changed and adjusted.

The shells 3 and 2 are connected to each other to be axially displaceable relative to each other. It is enough if one shell is freely movable with respect to the other shell. In the present case, the shell 3 can be displaced forwards and backwards with respect to the shell 2 in an axial direction. However, the shells 2, 3 are embodied such that they cannot fall apart. This shell connection, which is preferably realized by a snap, a bayonet or the like, allows a fast assembly, disassembly or cleaning of the components.

The preassembled unit formed of the two shells 2, 3 and the brake rubber 1 inserted therebetween is mounted into the casing brake or brake transmission, respectively. One of the shells 2 is thereby permanently fixed in the receptacle 4, while the other shell 3 is mounted to be axially displaceable. The receptacle 4 is rotatably mounted in the casing brake by means of the bearings 11. This means that the straining means, here the shells 2, 3 with the brake rubber 1, can rotate together with the stuffing pipe about the axis L of the stuffing pipe 7. A drive not described in more detail can thereby be provided, which is generally known and need not be explained in more detail. It is also possible that the receptacle 4 together with the shells 3, 2 and the brake rubber 1 are only rotatably mounted in the bearings 11 and are driven together with the stuffing pipe 7. Reference number 15 designates a securing element by means of which the shell 2 is fixed in the receptacle 4. This securing element 15 can be embodied, for example, as a spring lock washer, a straining ring or a catch.

The device also additionally comprises an adjusting device 5 acting on the straining means, here the shell 3, in such a way that the axial prestress of the brake ring 1 is easily adjustable and maintained. The adjusting device 5 comprises a holding device, e.g. the holding star 5, which is not driven, but is permanently connected to the housing 10 also when a twisting-off process is carried out. The holding device is embodied such that the stuffed sausage is passed therethrough and retained against rotation. The holding star 5 is here formed of two parts. The inner part 5b of the holding star 5 can be adjusted axially, for example, by the thread 9. The outer part 5a is permanently connected to the housing 10.

Between shell 3 which, for example, rotates and the stationary holding star 5 a sliding ring 6 is located. When the holding star 5 is adjusted, it presses more or less strongly onto the shell 3. The brake rubber is deformed by the axially displaceable shell 3, whereby the prestress of the brake is adjusted. The sliding ring 6 is preferably made of plastics. The use of the sliding ring 6 between the holding device 5 and the shell 3 reduces the wear of the shell 3 and of the holding device 5. In case of wear, the plastic sliding ring 6 can be exchanged cost-effectively and easily.

Thus, the braking strain can be easily adjusted and maintained via the inner part 5b of the holding star also during the production, i.e. when stuffing material is discharged into the casing. Even if the casing brake is driven, that is, when the shell 3, 2 and the brake ring 1 rotate about the axis L, the brake power can be easily adjusted by the axial force which is transferred to the shell 3. The force emanating from the adjusting device and acting on the shell 3 is then maintained during the production.

An easy adjustment of the brake power during the production is also possible if the brake is not driven. If the casing brake is removed for cleaning purposes and, for example, the shells 2 and 3 or the unit including the shells 2 and 3, respectively, are disassembled, the correct brake pressure can be maintained when the brake is reassembled, because the state of the adjusting device, i.e. here the axial position of the inner part of the holding star 5, is maintained. This removal allows an easy disassembly and, thus, an improved hygienic situation as a result of the easy cleaning possibilities.

The embodiment shown in FIG. 1 as well as the embodiments shown below are shown in connection with a driven casing brake. Alternatively, the concept according to the disclosure is also possible in connection with a non-driven brake.

Alternatively, the construction shown in FIG. 1 can also be realized in such a way that the two shells 2, 3 are each mounted separately in a respective bearing and that one of these bearings (e.g. ball bearing) can be displaced axially. As each bearing includes a stationary and a rotating bearing ring the braking effect can be adjusted by an axial displacement of the bearings relative to each other, preferably by pressing onto the stationary bearing ring of the axially displaceable bearing. The axial force is then transmitted to the shell 3 via the bearing ring.

Figure 2:
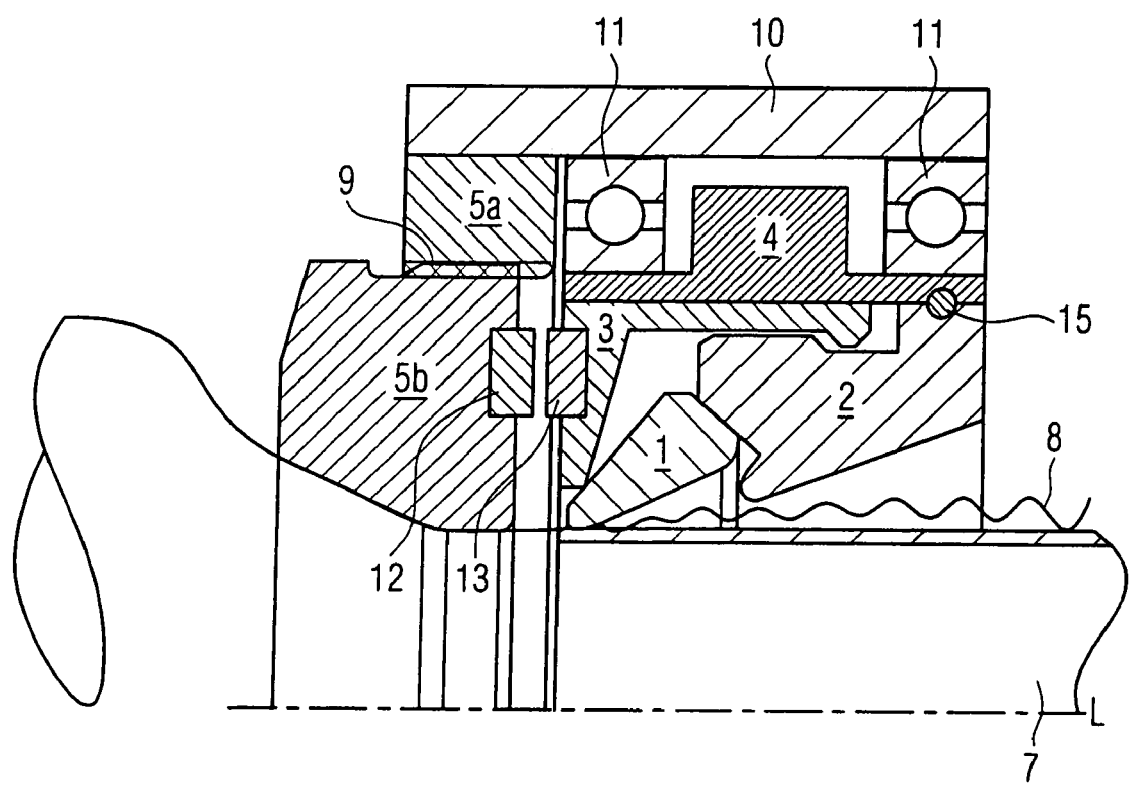
FIG. 2 shows a longitudinal section through a second embodiment according to the present disclosure.

FIG. 2 shows a second embodiment of the present disclosure, which corresponds substantially to the embodiment shown in FIG. 1, wherein the adjusting device comprises an annular magnet 12, however, the magnetic force of which acts in an axial direction on the shell 3. The shell 3 is thereby also at least partially magnetic, wherein the likewise annular magnet 13 is here incorporated in the shell 3—opposite to the magnet 12. The magnet 12 is here incorporated in the holding device 5. In this embodiment the inner part 5b of the holding device or holding star 5, respectively, is again axially displaceable by the thread 9 in the stationary holding star. By changing the axial position of the magnet 12 the axial force acting on shell 3 is varied, so that the shell 3 can be displaced in an axial direction so as to change the axial strain of the brake ring 1. Instead of arranging the magnet 12 to be axially displaceable, it is also possible to provide means that change the magnetic force of magnet 12. The annularly arranged magnet 12 is, for example, an electromagnet the intensity of which is freely selectable within a range for adjusting the axial force. In this embodiment, too, the brake power is adjusted during the production by the adjusting device, here by the magnetic force of the magnet 12, so as to obtain an exactly adjusted brake power. An essential advantage of this alternative resides in the contactless and, thus, wearless axial transmission of forces between the stationary adjusting device and the possibly rotating shell 3, that is, between the rotating 12 and the stationary magnet 13. The defined magnetic force is then maintained for the production. As was described above, the magnetic force is defined by the axial position of the magnet and is maintained in the unvaried state also if the shells are removed. Should an electromagnet be used as magnet, which is adjustable with respect to its intensity, the state of the adjusting device can also be maintained if the shells are removed and the brake is mounted anew by readjusting the corresponding magnetic intensity.

Figure 3:
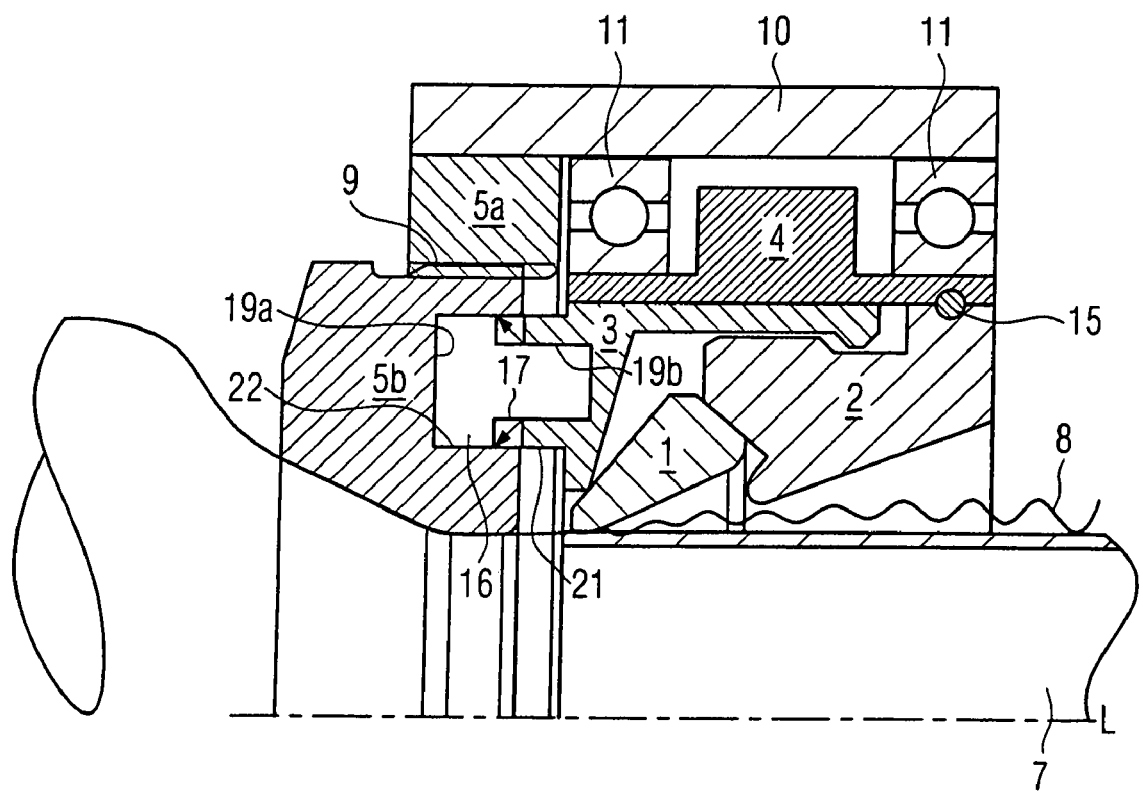
FIG. 3 shows a longitudinal section through a third embodiment according to the present disclosure.

FIG. 3 shows another embodiment according to the present disclosure, which corresponds, again, substantially to the first and the second embodiment. In contrast to the exemplary embodiment shown in FIGS. 1 and 2, the adjusting device comprises in this case a sealed space 16 filled with a fluid. The sealed space 16 includes two sections 19a, b whereof one 19b moves in an axial direction when the pressure in the sealed space 16 is changed. Here, a section 19a of the sealed space 16 is formed in the holding device 5 or the holding star 5, respectively, while the other section is in communication with the shell 3 and is formed integrally with the first shell 3. The sealed space 16 is arranged concentrically with respect to the stuffing pipe 7. The two sliding ring seals 17 are arranged on the extension of the movable shell 3, that is, at section 19b.

The outer surfaces 21 of section 19b and the sliding ring seals 17 are arranged such that they can slide along the inner surface 22 of space 16.

If the pressure in space 16 is changed, e.g. by varying the filling amount of the medium via a non-illustrated duct, the section 19b is displaced in an axial direction, and together with it the shell 3, so that the axial strain of the brake ring 1 is changed. Section 19a remains in an unchanged position.

The pressure in space 16 can also be obtained by decreasing the volume in space 16 by rotating one part, here the inner part 5b of the holding device 5, for example, by the thread 9 in an axial direction. If the pressure increases, section 19b then slides in an axial direction so that the shell 3 presses on the brake ring 1.

The sliding ring 17 is preferably made of plastics.

The transmission of the axial force from the stationary part, here holding part 5 or section 19a of space 16, to the, for example, rotating part, here section 19b together with shell 3, takes place nearly without any friction via the sliding ring seal 17 and, thus, in a nearly wearfree manner.

If the correct pressure and, thus, the correct braking strain is adjusted, here, too, the pressure is maintained during the production. The adjustment of the brake power can be easily reproduced also after the cleaning of the brake, by readjusting the determined pressure.

Figure 4:
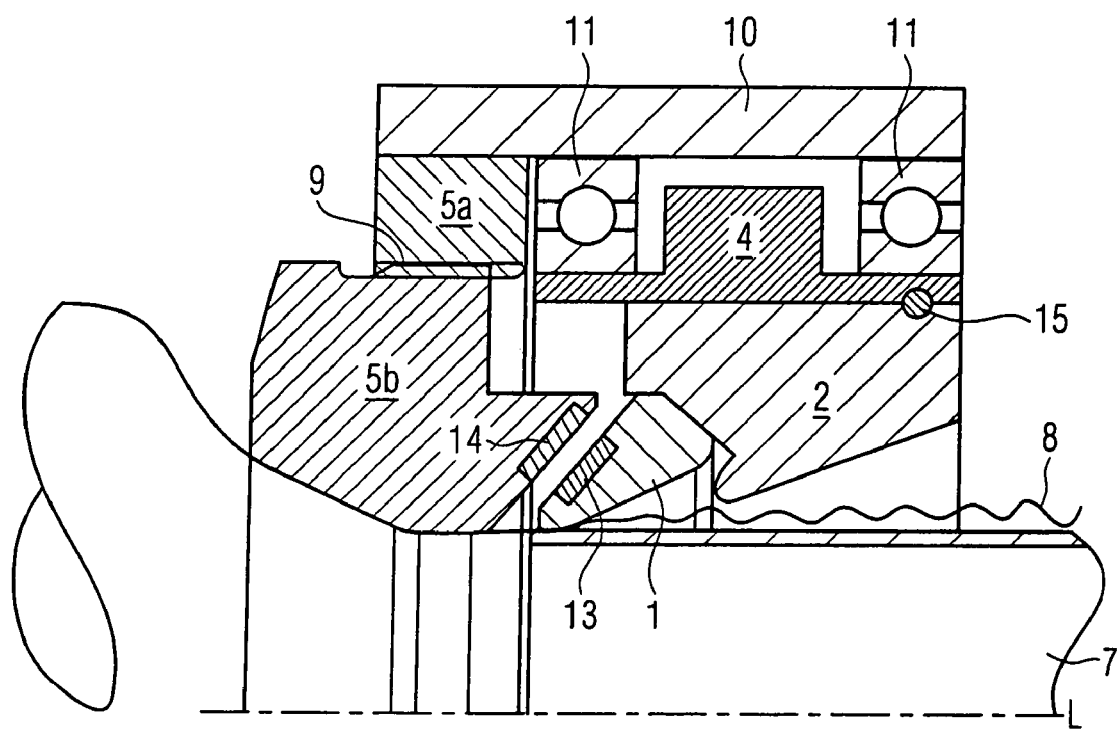
FIG. 4 shows a longitudinal section through a fourth embodiment according to the present disclosure.
Figure 5:
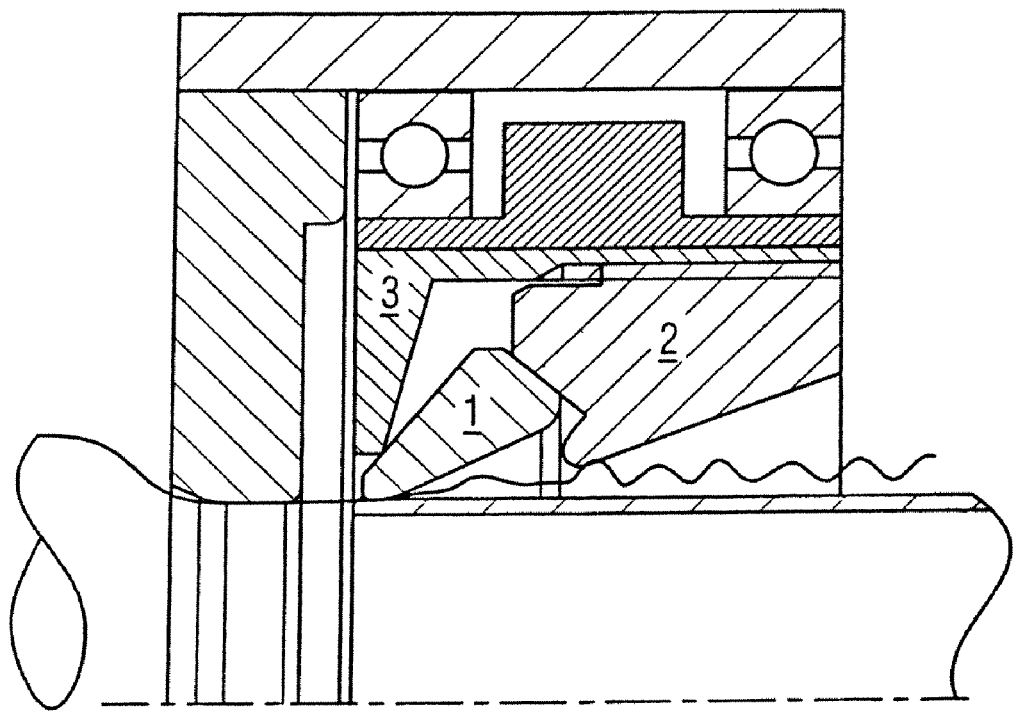
FIG. 5 shows a section through a casing brake according to the prior art.

FIG. 4 shows another embodiment according to the present disclosure. The embodiment shown in FIG. 4 corresponds substantially to the embodiment shown in FIG. 2, wherein the straining means is formed by a shell 2, which axially supports the brake ring 1, and a magnet 14 the magnetic force of which likewise axially supports the brake ring 1, with the brake ring 1 being at least partially magnetic. In this case, the magnet 13 is annularly incorporated in the upper surface of the brake ring 1. The shell 2 is firmly arranged at the receptacle 4, which is explained in more detail in the preceding example, mounted rotatably by the bearings 11. In the embodiment shown in FIG. 4, the magnet 14, which forms part of the straining means, is placed opposite to the magnet 13. The magnet 14 is, in this case, incorporated in the holding device, here the holding star 5. Like in the preceding exemplary embodiments, the inner part 5b of the holding device is arranged to be axially movable by the thread 9. Over the distance of magnets 14 and 13 also the magnetic force varies, which axially and/or radially strains the brake ring 1. The magnet 13 is here incorporated obliquely in the upper surface of the tapered brake ring. The magnet 14 is arranged with a corresponding slant.

As was explained in connection with the second exemplary embodiment, the suitable brake power is easy to reproduce by maintaining the magnetic force even after the disassembly and the cleaning.

Instead of arranging the magnet 14 to be axially movable for changing the axial force, it is also possible that the adjusting device comprises means for changing the magnetic force of the magnet 14. The magnet 14 may be an annular electromagnet.

In the method according to the present disclosure the casing brake is placed at a free end 7a of a stuffing pipe on which the casing is positioned. The brake power of the casing brake is accomplished in a mounted state by actuating the adjusting device 5, 12, 16 during the production, that is, during the stuffing of the casing. The adjusting device thereby exerts an axial force and/or a radial force on the straining means 2, 3, so that the axial and/or the radial prestress of the brake ring is adjusted and maintained during the production.

The axial force can thereby, for example, be transferred from the stationary adjusting device, which is not rotating, to the rotating straining means. The adjusting device is maintained in the state that corresponds to a specific brake power.

It is possible that different settings of the brake power, e.g. for different calibers, are maintained when the casing brake is dismounted. Different brakes having a preadjusted brake power may be used for different calibers.

The invention claimed is:

1. Casing brake for holding a casing (8) at a free end (7a) of a stuffing pipe (7), via which the casing (8) is stuffed with a pasty material, comprising:
   a brake ring (1) to be arranged around the stuffing pipe (7a) and being strainable such that the brake ring presses the casing (8) onto the stuffing pipe (7),
   a straining means (2, 3, 14) for straining the brake ring (1), and
   an adjusting device (5, 12, 16) to strain the brake ring during production of stuffed casings, the adjusting device exerting a variable force on the straining means (2, 3, 14) and maintaining the variable force such that the straining of the brake ring (1), and thus a brake power, is adjustable during the production of stuffed casings,
   the straining means (2, 3, 14) including a first (3) and a second (2) shell between which the brake ring (1) is disposed, wherein at least the first shell (3) can be displaced freely toward the other shell (2) in an axial direction, wherein the adjusting device (5, 12) displaces at least the first shell (3) so as to change the axial straining of the brake ring (1).

2. Casing brake according to claim 1, wherein the casing brake comprises at least one bearing (11), so that the first and second shell (2, 3) are rotatably mounted and drivable about the longitudinal axis (L) of the stuffing pipe (7).

3. Casing brake according to claim 1, wherein the adjusting device (5, 12, 16) comprises a holding device (5) which is arranged opposite to the free end (7a) of the stuffing pipe (7) for retaining the stuffed casing (8) against twisting, wherein at least one part of the holding device (5b) is substantially axially adjustable and presses against the first shell (3).

4. Casing brake according to claim 3, wherein a sliding ring (6) is mounted between the holding device (5) and the first shell (3), which transfers the force to the first shell (3).

5. Casing brake according to claim 1, wherein two shells (2, 3) are configured as preassembled units in such a way that they can be displaced axially relative to each other and comprise a shell connection which is embodied such that the shells (2, 3) do not fall apart.

6. Casing brake according to claim 1, wherein the first and second shell (2, 3) are connected to each other by a shell connection, and that the second shell is fixed to a receptacle (4) which is rotatably mounted about the longitudinal axis (L) of the stuffing pipe by at least one bearing (11).

7. Casing brake according to claim 1, wherein the adjusting device (5, 12, 16) comprises a magnet (12), and that the first shell (3) is embodied at least partially magnetically in such a way that the shell (3) is axially displaceable by the magnetic force.

8. Casing brake according to claim 7, wherein the magnet (12) is axially displaceable.

9. Casing brake according to claim 8, wherein the holding device (5) comprises the magnet (5).

10. Casing brake according to claim 7, wherein the adjusting device (5, 12, 15) comprises means so that the magnetic force is adjustable.

11. Casing brake according to claim 1, wherein both shells are mounted separately in corresponding bearings, wherein at least one of the bearings can be displaced axially and the adjusting device axially displaces the displaceable bearing together with the corresponding shell.

12. Casing brake for holding a casing (8) at a free end (7a) of a stuffing pipe (7), via which the casing (8) is stuffed with a pasty material, comprising:
a brake ring (1) to be arranged around the stuffing pipe (7a) and being strainable such that the brake ring presses the casing (8) onto the stuffing pipe (7),
a straining means (2, 3, 14) for straining the brake ring (1), and
an adjusting device (5, 12, 16) to strain the brake ring during production of stuffed casings, the adjusting device exerting a variable force on the straining means (2, 3, 14) and maintaining the variable force such that the straining of the brake ring (1), and thus a brake power, is adjustable during the production of stuffed casings, wherein the adjusting device (5, 12, 16) comprises a sealed space (16), in which a fluid is enclosed and which includes two sections (19a, b), one section (19b) is movable in an axial direction if the pressure in the sealed space (16) is changed and transfers an axial force to the first shell (3), as well as a means for changing the pressure in the space (16).

13. Casing brake according to claim 12, wherein the section (19b) moving in an axial direction is integral with the first shell (3).

14. Casing brake according to claim 12, wherein the pressure can be changed by varying the volume of the sealed space (16) or by varying the filling amount of the fluid through a corresponding duct.

15. Casing brake according to claim 1, wherein the adjusting device is embodied such that the first shell (3) is movable in an axial direction by means of the jet of a fluid.

16. Casing brake for holding a casing (8) at a free end (7a) of a stuffing pipe (7), via which the casing (8) is stuffed with a pasty material, comprising:
a brake ring (1) to be arranged around the stuffing pipe (7a) and being strainable such that the brake ring presses the casing (8) onto the stuffing pipe (7),
a straining means (2, 3, 14) for straining the brake ring (1), and
an adjusting device (5, 12, 16) to strain the brake ring during production of stuffed casings, the adjusting device exerting a variable force on the straining means (2, 3, 14) and maintaining the variable force such that the straining of the brake ring (1), and thus a brake power, is adjustable during the production of stuffed casings, wherein the straining means comprises a shell (2) which supports the brake ring (1), and a magnet (14) which supports the brake ring (14) due to its magnetic force, and the brake ring (1) is at least partially magnetic such that the brake ring (1) can be strained by the magnetic force of the magnet (14).

17. Casing brake according to claim 16, wherein the adjusting device (5, 12, 16) is embodied such that the magnet (14) is disposed to be axially movable.

18. Casing brake according to claim 16, wherein the adjusting device (5, 12, 16) comprises means for changing the magnetic force of the magnet (14).

19. Method for adjusting the brake power of a casing brake, comprising:
positioning a casing brake at a free end (7a) of a stuffing pipe (7), via which stuffing pipe a mounted casing (8) is stuffed with pasty material,
wherein the casing brake comprises a brake ring (1), which is arranged around the stuffing pipe (7) and which can be strained by a straining means (2, 3, 14) and presses the casing onto the stuffing pipe (7),
stuffing the casing with pasty material,
adjusting the strain of the brake ring (1) during production of a stuffed casing by actuating an adjusting device (5, 12, 16), the adjusting device exerting a variable force on the straining means (2, 3, 14) and maintaining the variable force during the production of the stuffed casing, and
during the production, driving the straining means (2, 3) together with the brake ring at least temporarily about a longitudinal axis (L) of the stuffing pipe for twisting off the stuffed casing, and the adjusting device is not driven.

20. Method for adjusting the brake power of a casing brake, comprising the following steps:
positioning a casing brake at a free end (7a) of a stuffing pipe (7), via which stuffing pipe a mounted casing (8) is stuffed with pasty material,
wherein the casing brake comprises a brake ring (1), which is arranged around the stuffing pipe (7) and which can be strained by a straining means (2, 3, 14) and presses the casing onto the stuffing pipe (7),
stuffing the casing with pasty material,
adjusting the strain of the brake ring (1) during production of a stuffed casing by actuating an adjusting device (5, 12, 16), the adjusting device exerting a variable force on the straining means (2, 3, 14) and maintaining the variable force during the production of the stuffed casing, and
maintaining the adjusting device (5, 12, 16) in a state that corresponds to a specific brake power.

21. Method according to claim 20, wherein different casing brakes adjusted with a corresponding preadjusted brake power are used for different sausage calibers.

* * * * *